(12) United States Patent
Lesur

(10) Patent No.: US 8,709,271 B2
(45) Date of Patent: Apr. 29, 2014

(54) LASER MARKING OF A CARD

(75) Inventor: Jean-Luc Lesur, Bras (FR)

(73) Assignee: Gemalto SA, Meudon (FR)

( * ) Notice: Subject to any disclaimer, the term of this patent is extended or adjusted under 35 U.S.C. 154(b) by 1302 days.

(21) Appl. No.: 11/919,488

(22) PCT Filed: Apr. 25, 2006

(86) PCT No.: PCT/EP2006/061815
§ 371 (c)(1),
(2), (4) Date: Oct. 29, 2007

(87) PCT Pub. No.: WO2006/117312
PCT Pub. Date: Nov. 9, 2006

(65) Prior Publication Data
US 2009/0130394 A1    May 21, 2009

(30) Foreign Application Priority Data
Apr. 29, 2005   (FI) .................................. 05 04363

(51) Int. Cl.
*C03C 15/00*         (2006.01)
(52) U.S. Cl.
USPC ................... 216/94; 216/65; 216/97; 438/708
(58) Field of Classification Search
USPC ........... 216/65, 66, 33, 34, 35, 41, 67, 81, 28, 216/59, 62, 80, 94, 95; 264/1.23, 2.31, 37, 264/1.37, 1.38; 438/709, 707, 708
See application file for complete search history.

(56) References Cited

U.S. PATENT DOCUMENTS

| | | | |
|---|---|---|---|
| 5,340,628 A | | 8/1994 | McKillip et al. |
| 5,354,401 A | * | 10/1994 | Asahi et al. .................... 156/230 |
| 5,994,024 A | | 11/1999 | Tunney et al. |
| 6,245,167 B1 | * | 6/2001 | Stein ............................... 156/64 |
| 2002/0022112 A1 | * | 2/2002 | Hoeppner et al. ............. 428/156 |
| 2003/0183695 A1 | * | 10/2003 | Labrec et al. .................. 235/487 |
| 2004/0011874 A1 | * | 1/2004 | Theodossiou et al. ......... 235/488 |
| 2004/0198858 A1 | | 10/2004 | Labrec |
| 2005/0109850 A1 | * | 5/2005 | Jones ............................. 235/487 |
| 2005/0247794 A1 | * | 11/2005 | Jones et al. .................... 235/487 |

FOREIGN PATENT DOCUMENTS

| | | |
|---|---|---|
| DE | 43 15 339 A1 | 11/1994 |
| EP | 0 987 121 A2 | 3/2000 |
| JP | 2-251438 | 10/1990 |

OTHER PUBLICATIONS

PCT/ISA/210.
PCT/ISA/237.

* cited by examiner

*Primary Examiner* — Lan Vinh
(74) *Attorney, Agent, or Firm* — Buchanan Ingersoll Rooney PC

(57) ABSTRACT

The invention relates to a method for the laser marking of a support having a body and a cover sheet. A laser beam is used to etch the body of the support through the thickness of the cover sheet. The support is laminated either during or after the laser marking in order to reduce or prevent deformations in the cover sheet resulting from etching.

13 Claims, 10 Drawing Sheets

FIG.3 : Binoculars observation

FIG. 4: Observation prior to / after lamination
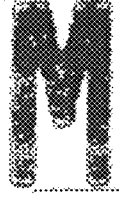

FIG.5 : Observation prior to / after lamination with microscope
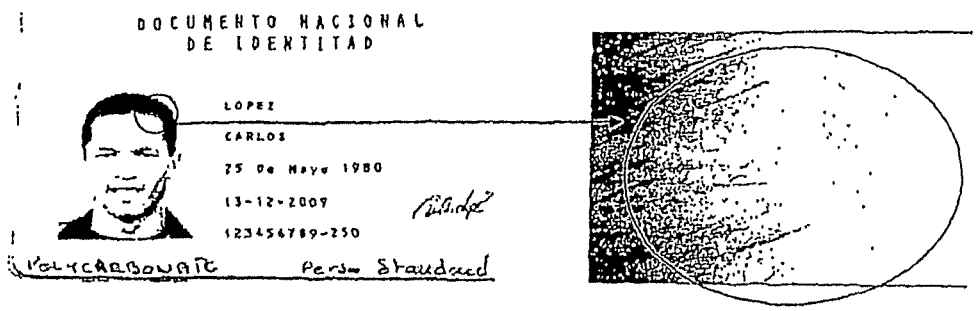
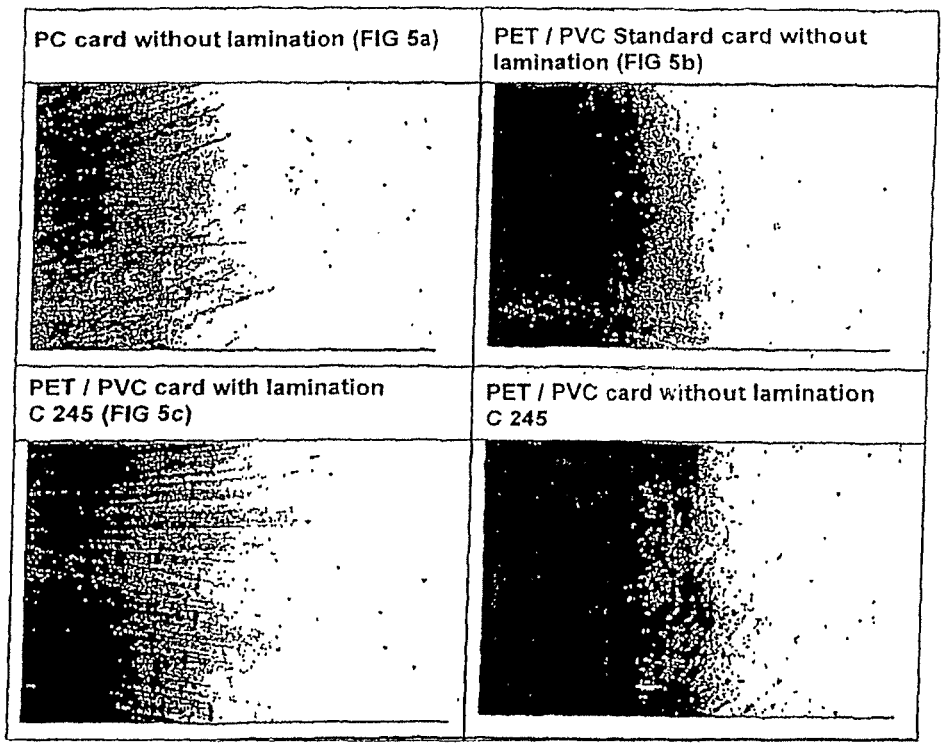

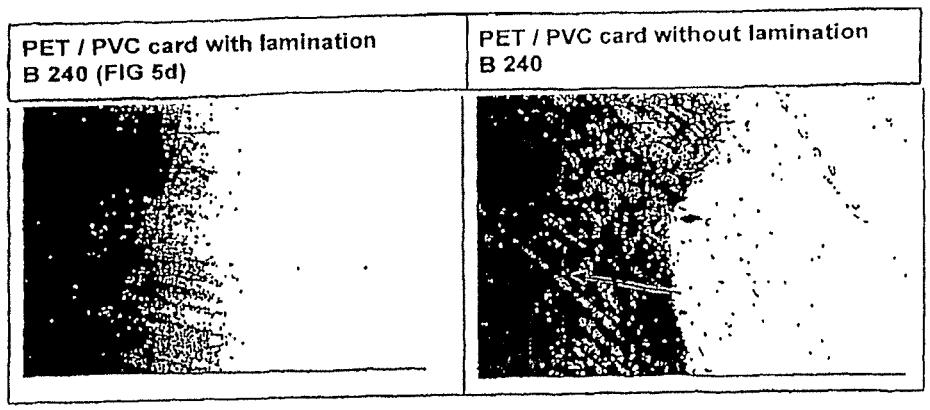
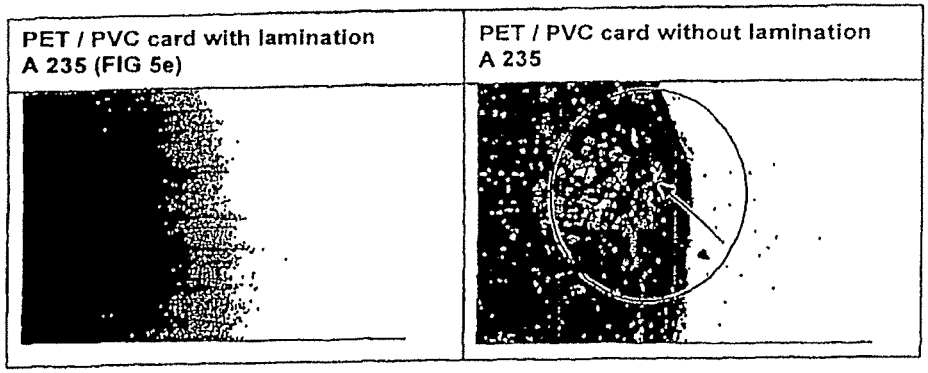

FIG. 6 : Measurement of the deformation as seen on the surface of the card
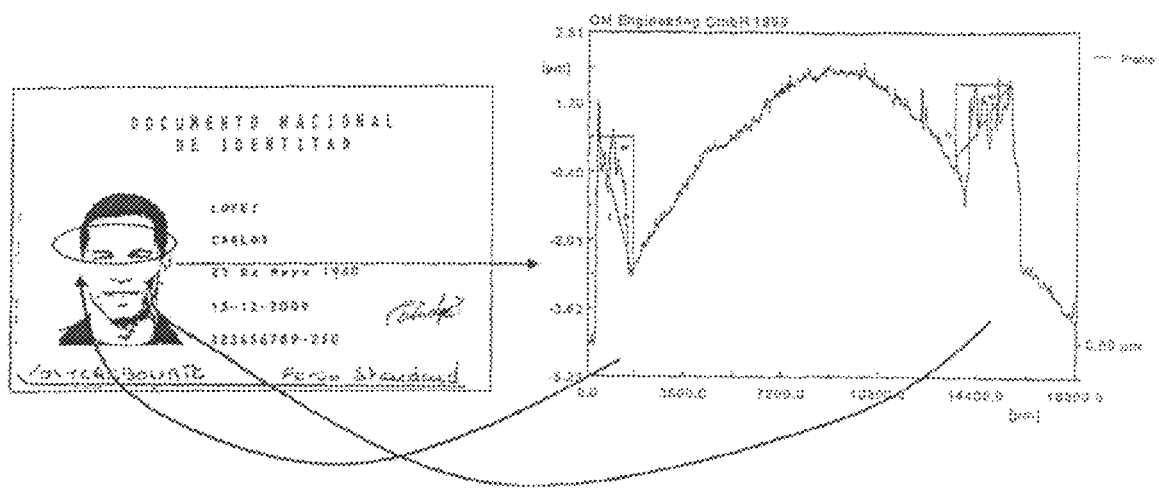
FIG. 6a :
PC card no measurable deformation
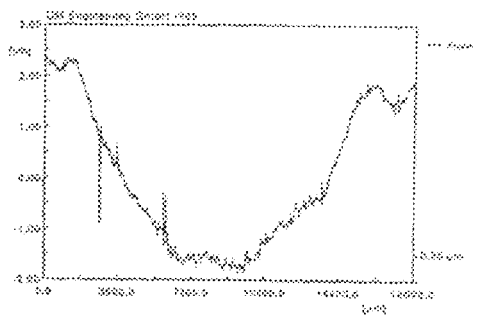
FIG. 6b :
PET / PVC standard cards no lamination
    Shape 0
      Height (h) = 3,24 μm
    Shape 3
      Height (h) = 1,77 μm

FIG. 6c:
PET / PVC card C 245 :
without lamination                                                          with lamination
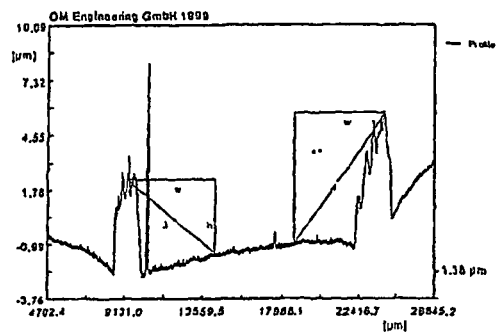
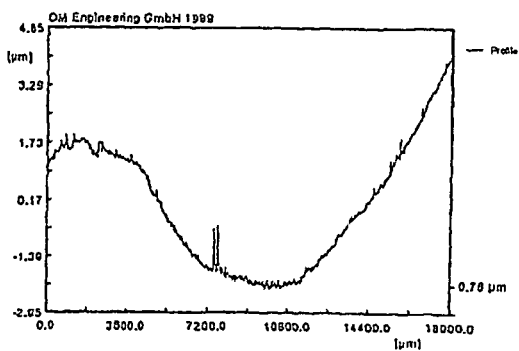
Shape 0
Height (h) = 3,72 µm
No measurable deformation
Shape 3
Height (h) = 6,64 µm FIG. 6 d :
PET / PVC card B 240 :
without lamination
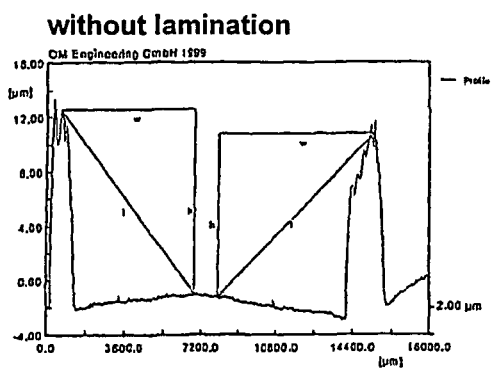
Shape 0
Height (h) = 13,65 μm
Shape 3
Height (h) = 12.01 μm
without lamination
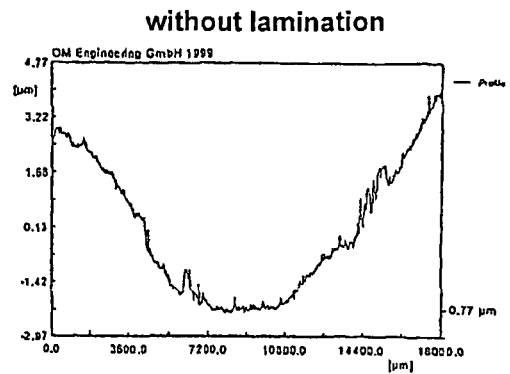
No measurable deformation FIG. 6 e :
Carte PET/PVC A 235 :
without lamination
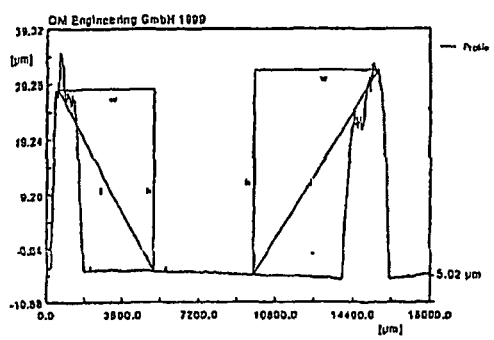
Shape 0
Height (h) = 33,37 μm
Shape 3
Height (h) = 37,58 μm
without lamination
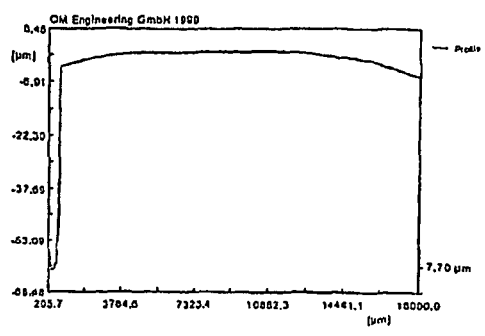
No measurable deformation

LASER MARKING OF A CARD

The present invention relates to a method for the laser marking of a plastic support comprising a body and a cover sheet. The invention also relates to a facility making it possible to perform such a marking as well as the marked support obtained.

The present invention more particularly relates to the graphic customization, by thermal effect or carbonization effect, of the surface of a support using the thermal energy carried by a laser beam.

Without it being a limitation of the invention, the plastic support relating to the invention may more particularly be plastic cards (payment, identification, phone card, etc. types).

It should be noted that such plastic cards are obtained by laminating together several sheets or layers of material:
the card body which is constituted by a set of sheets, more particularly including a so-called card "core" sheet, or one relatively thick (giving a thickness of the order of 1 mm) sheet (if the body is reduced to the core). Such body is, in the case of plastic cards, generally made of PVC (polyvinyl chloride) or PET (polyethylene), or PC (polycarbonate),
a thin (of the order of a few dozens or even a few hundreds of microns) cover sheet stuck onto the body surface. Such cover sheet is also called an "overlay" in the known Anglo-Saxon literature and both terms will be indifferently used in this description. It is generally transparent,
and in some cases an intermediate adhesive coating positioned between the body and the cover sheet. Such adhesive coating is more particularly intended to make the body and the cover sheet integral.

As will be described, the invention is more particularly advantageous when applied to supports of the plastic card type, the body and/or the overlay of which is made of a plastic material, the softening point of which is low.

It should be noted that the "softening point" corresponds to the temperature at which the plastic material begins to melt under the atmospheric pressure.

Within this description, a low "softening point" is defined as corresponding to a temperature lower than 100° C. Plastic materials such as PVC or PET are examples of plastic materials, the softening point of which is low (of the order of 70° C.).

On the contrary, the material such as polycarbonate (PC) is a plastic material, the softening point of which is "high" (of the order of 140° C.).

Performing a laser marking of a plastic support comprising a body and a cover sheet—more particularly in the field of plastic cards—is already known.

Such a laser marking of plastic cards particularly makes it possible to customize cards when the various layers or sheets thereof have been laminated together.

Such a marking is performed by etching the surface of the support with a laser beam.

The material of the cover sheet may be selected not to be substantially altered by this laser beam etching.

In this case, the material of the cover sheet is transparent to the laser beam and the surface of the body of the support only is altered by the laser beam (this surface is called "core" in the case of a card).

Alternatively, it is also possible to choose materials composing the card which help obtaining a specific visual aspect after the laser beam etching.

In this respect, the material of the cover sheet may be selected so as to obtain a laser customization adapted to the support manufactured. Such material can therefore be doped with a material (in the case of a mixture) or with particles, which are more or less sensitive to the laser, with a view to improving the result of the marking.

In this case, the material of the cover sheet helps to perform the marking operation.

After having gone through the thickness of the cover sheet (and of the coating if any), the beam thus etches the surface of the body which is turned towards the cover sheet.

To perform such an etching it is possible to use various types of laser beams.

However, it should be noted that the function that the laser beam has to fulfill mainly consists in bringing a sufficient thermal energy onto the body of the support to alter and color its surface. For such a function a YAG laser is the most suitable laser type.

The etching of the surface of the body thus produces, thanks to the thermal effect, a local coloration of said surface, at the point of impact of the laser beam. Such coloration tends to locally blacken the surface of the body (surface carbonization effect, burning effect, without substantially altering the mechanical proprieties of the material—for example by causing cracks or holes which could have been produced by too strong a laser energy).

The cover sheet may also be blackened by this etching (case when the material of the sheet is altered by the laser beam).

It is generally requested to obtain the darkest coloration possible.

The "black" level of the coloration obtained after the laser etching is thus a quality criterion of the marking—and it should be noted that this criterion is referred to by the name of "marking density". A very important marking density thus results from a very dark marking which is what is wanted.

Within the scope of this document, a "high density" marking is defined as a marking having a density higher than 1 Db.

It should be reminded that the density of black in Db is given by the formula: $\log_{10}^{(1/R)}$ where $R=\Phi_1/\Phi_0$ (where $\Phi_0$=light flux prior to the sampling, $\Phi_1$=light flux after the sampling)—refer to the densitometric standard DIN 16536, in this respect.

Any requested visual pattern can be obtained by repeating the etching of the laser beam in various places of the body surface. It is thus possible to write characters or any figure on the body of the card (a resolution of the order of 300 to 600 dpi can typically be obtained with a laser—which resolution may reach several thousands of Dpi under certain conditions—and it is thus possible to reproduce photographic images, for example, from points of impact of a laser beam on the body of an identification plastic card).

As mentioned hereabove, the laser marking is implemented during the manufacturing of plastic cards, more particularly in order to graphically customize the cards when the cover sheet has been applied.

The marking of a support (such as a card) by a laser thus constitutes an advantageous provision.

However, a limit is associated with such marking operation.

As a matter of fact, it has been observed that a laser beam energy absorbed per surface unit of the card existed for each laminated card structure, beyond which deformations of the cover sheet occur.

Such deformations more particularly correspond to a modification of the condition of the material of the body and/or the cover sheet, or even to a separation of the cover sheet in some cases.

Such deformations may result in two unwanted effects:
firstly, they tend to lighten the aspect of the marking, when the support is observed. Such deformations reduce the marking density observed through the cover sheet.
secondly, they can deform the geometry of the visual pattern created by the marking—which can more particularly result in an indistinct perception of such pattern for a viewer.

Such deformations are more particularly observed on supports the body of which is made of a material such as PET or PVC.

When using such materials, the deformations are likely to appear even with a laser beam of a moderate power (such a "moderate power" can be defined as corresponding to a 200 µJ energy), since a certain quantity of the energy absorbed per surface unit is exceeded for example by successive marking operations.

They can also appear on supports the body of which is made of a material which is more resistant to heat—for example PC—for higher power beams.

The main object of the invention is to improve the visual aspect (contrast/sharpness) of a laser marking performed on supports including cover sheets.

More particularly, this object is aimed at for high density laser markings.

This is required more particularly for supports the body of which is made of a material having a softening temperature lower than that of PC (for example PET or PVC).

Another aim of the invention is to obtain a very distinctly marked support.

Another aim of the invention is to obtain laser marked supports (more particularly by a high density marking), including no deformation such as those mentioned above.

Another aim is to obtain such advantages with an industrial type method, which is simple and not expensive.

To reach these aims, the invention provides, according to a first aspect, a method for the laser marking of a support comprising a body and a cover sheet, said method comprising the etching by a laser beam of the body of the support through the thickness of the cover sheet, the method being characterized in that it includes a support lamination step during or after the laser marking in order to reduce or prevent deformations of the cover sheet resulting from said etching.

Preferred but non-limitative aspects of the method according to the invention are as follows:
said support is a plastic support,
said rolling is a hot rolling,
said lamination is performed only on the regions of the support including a laser marking,
said lamination is performed by static lamination means,
said lamination is performed at the same time as said laser etching, the laser beam going through said lamination means,
said lamination is performed by static pressing of the support between lamination plates,
said lamination is performed at a temperature above the softening temperature of at least one of the materials which is in contact with the laser marking,
said lamination is performed using dynamic lamination means making it possible to laminate the support while the latter advances with respect to said lamination means,
said lamination is performed by pressing between two rollers the support advancing between said rollers.

According to a second aspect, the invention also provides the application of a method according to one of the preceding claims to the marking of a support including a body and a cover sheet and the body and/or the cover sheet of which is (are) made of a material, the softening temperature of which is lower than that of PC.

Preferred but not limitative aspects of such application are as follows:
said material of the body has a softening temperature which is under 140° C.,
said material of the body is PET or PVC.

According to a third aspect, the invention also provides a facility for marking a support comprising a body and a cover sheet, said facility including laser marking means, the facility being characterized in that it also includes lamination means for laminating the support and reducing or preventing deformations of the cover sheet resulting from such etching.

According to last aspect, the invention also provides a support having a body including a surface carbonization marking and at least one cover plastic sheet in contact with the marking, said body and/or cover sheet having a lower softening temperature than that of PC, the support being characterized in that said marking has a marking density higher than 1 Db and the surface of said cover sheet has, at rest, an evenness defect of less than 5 µm between a marked and a not marked area, for said density.

Preferred but non limitative aspects of such support are as follows:
said body and/or cover sheet has a softening temperature lower than 140° C.,
said body and/or cover sheet is made of PET or PVC,
it makes a plastic card comprising laminated sheets.

Other aspects, aims and advantages of the invention will become evident when reading the following description of the invention while referring to the appended drawings, in which:

FIG. 1 is a diagrammatic representation of the lamination step of a support, according to a first implementation of the invention,
   with FIG. 1a corresponding to a first alternative of this embodiment (simple lamination after laser customization),
   with FIG. 1b corresponding to a second alternative embodiment (lamination during the laser customization step),
   with FIG. 1c corresponding to a third embodiment (lamination performed at same time as the placing of a protection overlay).

FIG. 2 is a diagrammatic representation of the step of lamination of a support, according to a second implementation of the invention,
   with FIG. 2a corresponding to a first alternative of this embodiment (simple lamination after the laser customization),
   with FIG. 2b corresponding to a second alternative (lamination during the laser customization step and laser marking on the fly, during the displacement of the support),
   with FIG. 2c corresponding to a third alternative (lamination performed at the same time as the positioning of a protection overlay).

FIG. 3 illustrates the differences in visual aspects between a support, the body and the overlay of which are made of PC (FIG. 3a) and a support, the body of which is made of PET and the overlay is made of PVC (PET/PVC) (FIG. 3b), with both types of cards having undergone the same laser marking method according to the state of the art, FIG. 4 illustrates the effect of the implementation of the invention—more particularly as regards the marking density and the distinctness—by illustrating the visual aspect of the supports obtained observed with binoculars:

⇒ By a means of a laser marking method according to the state of the art, on a support, the body of which is made of PC (FIG. 4a), ⇒ By a means of a laser marking method according to the state of the art, on a support, the body of which is made of PET/PVC (FIG. 4b), ⇒ By a means of a laser marking method according to the invention on three supports, the body of which is made of PET/PVC (FIGS. 4c to 4e), FIG. 5 illustrates the effect of the implementation of the invention—more particularly in terms of deformations—by illustrating the visual aspect of the obtained supports observed with a microscope:

⇒ By means of a laser marking method according to the state of the art, on a support, the body of which is made of PC (FIG. 5a), ⇒ By means of a laser marking method according to the state of the art, on a support, the body of which is made of PET/PVC (FIG. 5b), ⇒ By a means of a laser marking method according to the invention, of three supports, the body of which is made of PET/PVC (FIGS. 5c to 5e), FIG. 6 quantitatively illustrates a deformation of the surface of supports resulting from the laser customization without the invention being implemented.

Now the invention will be described, considering the example of a support having the form of a plastic card and the body of which is made of PC, or a material the softening temperature of which is lower than that of PC—for example PET or PVC.

A cover sheet covers the support to protect it or to give it a desired aspect, or to include safety elements such as a hologram. Such a sheet is described in the examples hereinunder and has a thickness between 50 and 100 μm.

For simplicity, cards will be called PC card or PET/PVC card although the material actually designates the body of the card.

Of course, the invention is not limited to such supports—it can be applied to all types of supports mentioned in the preamble of this text.

Still for reasons of simplicity, the words "card" and "support" will be used independently in the description hereinunder.

Laser Marking Methods

According to a first aspect, the invention relates to a method for the laser marking of a plastic support including a body and a cover sheet, said method comprising the etching by a laser beam of the body on the support through the thickness of the cover sheet.

In the case of the invention, the method includes a step of lamination of the support, in order to prevent deformations of the cover sheet which might be generated during such etching.

Such laminations step makes it possible to prevent—or at least to substantially reduce—the disadvantages mentioned at the beginning of this text.

It should be noted that the "lamination" of a support means an operation consisting in applying a pressure on the support with or without the addition of materials or additional sheets. Such "lamination" is typically performed when hot with the addition of a thermal energy at the level of the marking area (also called marked area). The thermal energy makes it possible to facilitate a remodeling of the cover sheet or to improve its adhesion to the body.

Such "lamination" is also distinct from the other operations—which may usually be designated by the term of lamination—which consist in assembling several layers or sheets in order to make a support such as a card or to protect a card after customization by adding a complementary sheet (particularly in order to increase its life and also for the safety of the information as regards fraud).

The "lamination" can be performed on the whole surface of the support.

Alternately, it is possible for the "lamination" to be performed only on the regions of the support including a laser marking.

Static Lamination

The "lamination" can be performed using static lamination means (i.e. the lamination is performed on the card when it is stationary with respect to the lamination means).

Such means may for example be heating plates.

FIGS. 1a to 1c illustrate three alternative implementations of such embodiment.

These Figures illustrate two plates 11, 12 between which a card C is statically hot pressed.

In the alternative shown in FIG. 1a, the lamination is performed after the laser etching.

FIG. 1b illustrates an alternative which makes it possible to shorten the method implementation time.

As a matter of fact, in this alternative, the lamination is performed at same time as the laser etching while providing that the laser beam goes through the lamination means (for example through a transparent window provided in such means, or by employing a laser beams transparent plate opposite the marking laser beam).

FIG. 1c illustrates an alternative in which an additional protection layer (or "overlay") is inserted between the plates and the support. Such layer is positioned on the support after the laser etching.

The "lamination" can be performed at a temperature higher than the softening point of the material for a time which can exceed a few seconds. For example, for a PET/PVC card, the operation can be performed at a temperature of 120° C. for 10 seconds. Another possibility giving good results consists in implementing such lamination at a temperature of 180° C. for 1 second.

Dynamic Lamination

It is also possible to implement the "lamination" in a dynamic way—i.e. on a card advancing with respect to the lamination means.

FIGS. 2a to 2c illustrate such possibility.

In these figures, the card C continuously advances between two lamination rollers 21, 22, which are typically heating and/or pressing the support.

This implementation makes it possible to operate according to a continuous process, which is advantageous.

In such an implementation, the "lamination" is thus performed using dynamic lamination means making it possible to "laminate" the support while the latter advances with respect to said lamination means.

It should be noted that in the case of a lamination and a laser marking performed at the same time, the lamination can be made at the same time as the marking and on another part of the support (in the case of a laser marking on the fly, during the displacement of the support).

It should be noted that in the case where the laser etching is performed at the same time as the lamination, the energy input of the laser may make it possible to reduce the thermal budget brought to the support by the lamination means.

As a matter of fact, in this case it is less necessary (or even not necessary any longer) to provide for heating means.

Figures 1, 2:
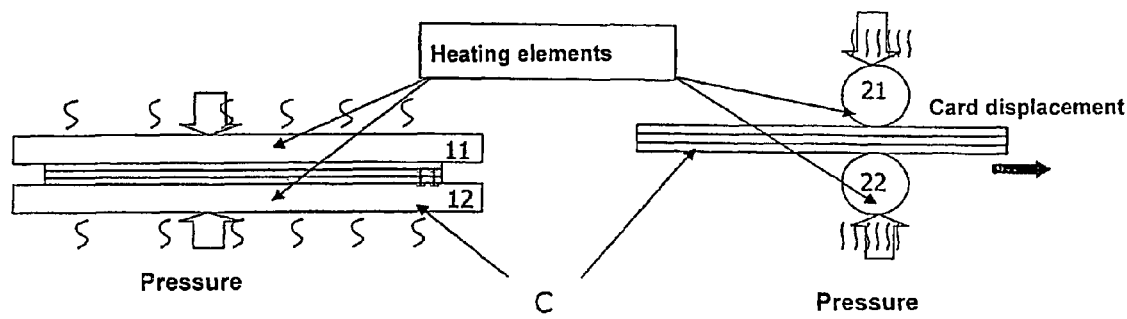
FIG. 2a illustrates a first alternative in which the lamination is performed after the laser etching.
FIG. 2b illustrates a second alternative in which the lamination is performed during the laser etching. In this case, the laser beam etches a region of a support which is different from the region which is laminated between the said lamination means.
Figures 1, 2:
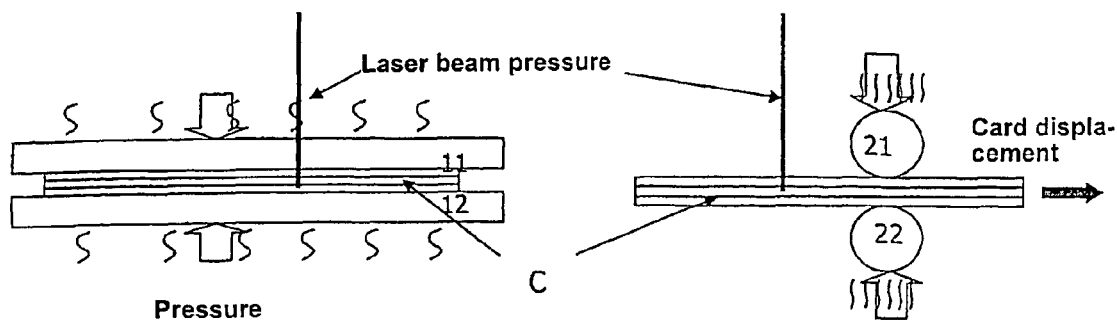
Figures 1, 2:
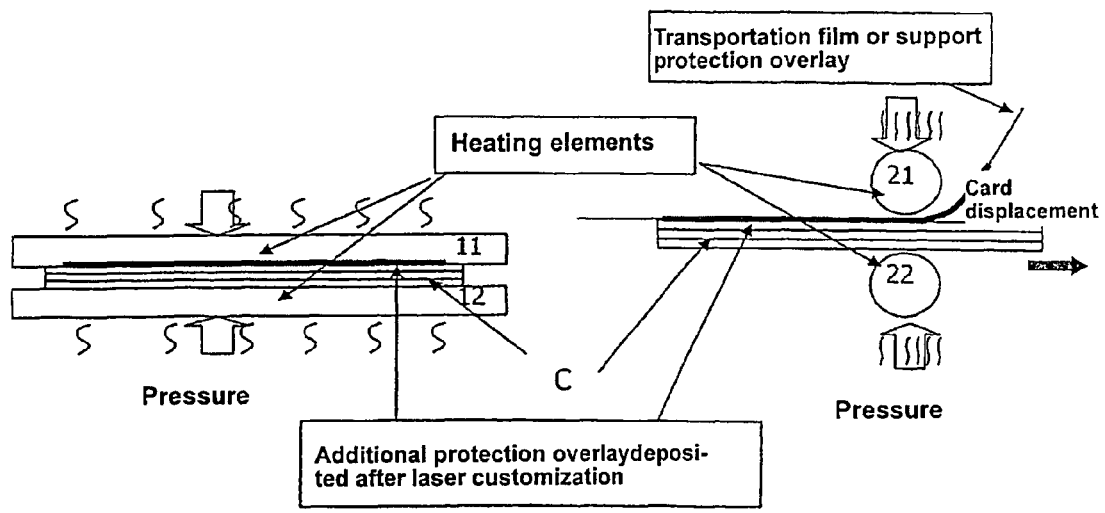

This can also be applied to the second alternative of the first embodiment (described here above while referring to FIG. 1b).

FIG. 2c illustrates (similar to FIG. 1c) an alternative in which an additional protection layer is deposited on the support after the laser etching.

The "lamination" can be performed as previously, at a temperature which is higher than the softening point of the material, more particularly for PET/PVC from 120 to 200° C. with a card advance motion velocity which can be reduced to a few seconds per inch (typically between 1 and 4 seconds per inch).

Precise indications on materials and softening temperatures

As mentioned hereabove, the invention more particularly applies to supports, the body of which is made of material the softening temperature of which is lower than that of PC.

The supports, the body of which is made of a material the softening temperature of which is lower than 140° C. is also particularly concerned by the invention—such softening temperatures being lower than the PC softening temperature.

The plastic materials having such softening temperatures are less expensive than PC.

The invention makes it possible to use them while obtaining results the quality of which corresponds to the quality requiring the use of more expensive materials such as PC, in the case of the known techniques.

The invention also makes it possible to make very high quality marked supports in PET or PVC.

The above is also true about the body of the support and the cover sheet.

Laser Marking Facility

The invention is implemented by a facility for marking a plastic support comprising a body and a cover sheet, this facility comprising as is known laser marking means and support transportation means opposite said marking means.

In the case of the invention, the facility also includes lamination means for laminating the support and prevent the deformations of the cover sheet which might be generated during said etching.

As has been seen, the lamination means may be static lamination means or dynamic lamination means.

In the case of static lamination means, plates can be used.

Such static lamination means—plates or any other means—can be capable of being traversed by the laser marking means so that the laser marking can be made during the "lamination".

It is also possible to implement dynamic lamination means making it possible to "laminate" the support while the latter advances with respect to the lamination means.

In this case, the lamination means can be rollers.

In any case, the lamination means are typically capable of heating and pressing said support. Alternatively, it is possible to provide for separate heating means.

Support Obtained

The invention makes it possible to obtain a plastic support such as a card comprising a body including a laser marking and a cover sheet, said body being made of PVC or PET, and having the following qualities:

the marking has a marking density higher than 1 Db, the surface of the cover sheet has, at rest, an evenness of less than 5 µm as regards to marking (no major unevenness defects above 5 µm—such defects being illustrated on the right part of the graph in FIG. 6, which corresponds to a defect which may occur during the passage from a very high density area to a low density area).

Such characteristics are higher than what is obtained for PET/PVC cards with the known marking methods.

Another way of characterizing the advantages obtained with the implementation of the invention consists in establishing that the invention makes it possible to produce a plastic support such as a card comprising a body including a laser marking and a cover sheet, said body being made of PVC or PET, having the following qualities:

the marking has a relative marking density higher than 1 Db, the cover sheet has no separation area with respect to said body.

Figure 3A:
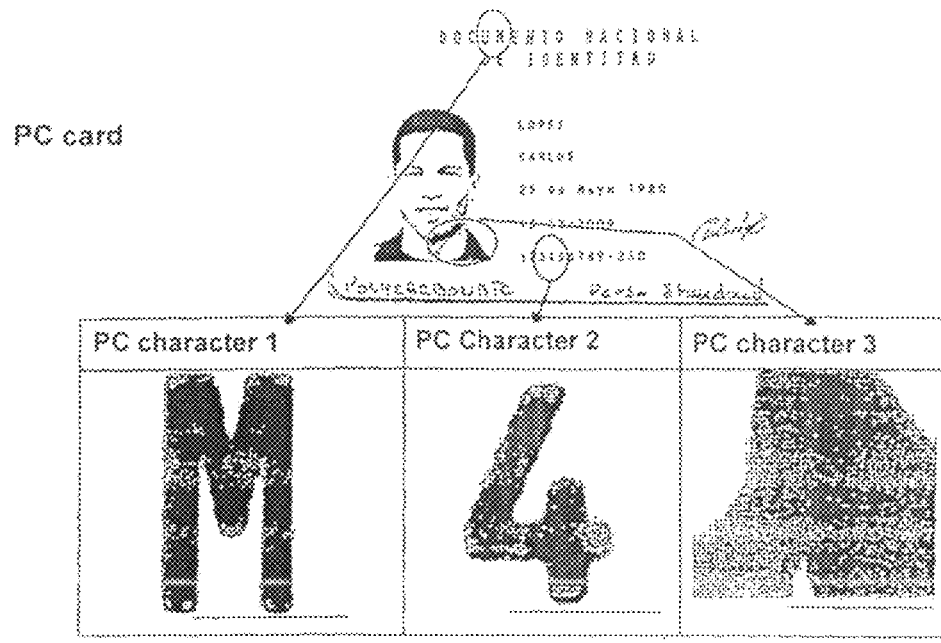
Figure 3B:
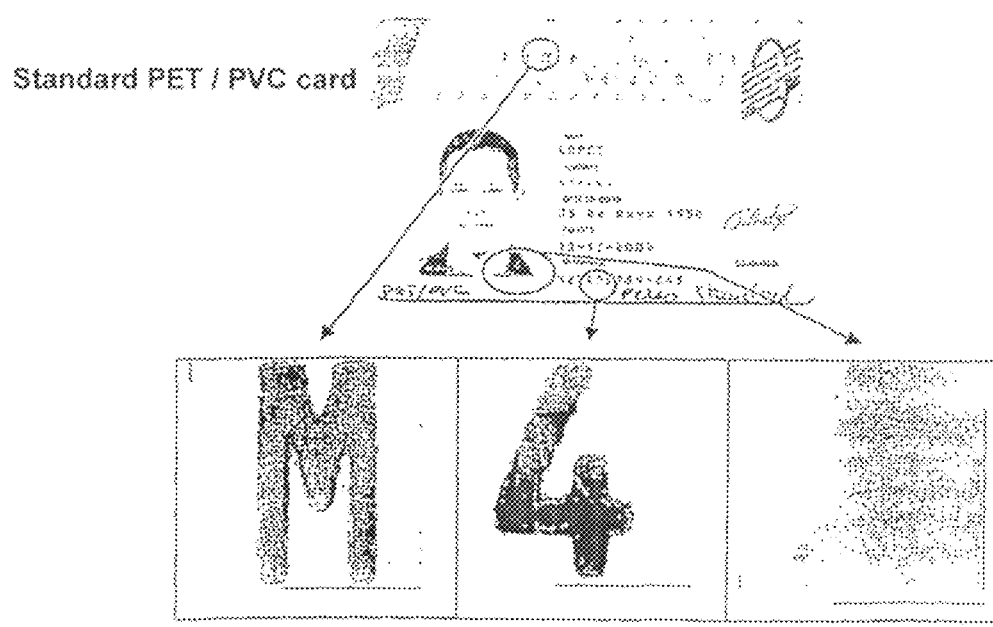

FIG. 3 illustrates the various visual aspects between a support of the body which is made of PC (FIG. 3a) and a support, the body of which is made of PET/PVC (FIG. 3b), both types of card having undergone the same laser marking method, according to the state of the art.

It can be established that the PET/PVC card has a visual aspect which is not so good (lower marking density and lower distinctness, and presence of an important relief at the surface of laser marking).

The markings, as illustrated here and in the Figures which follow, were obtained by a laser marking (writings, photographs, etc).

FIGS. 4 to 6 illustrate the effect of the invention on several cards having undergone the same laser etching steps under the same conditions.

FIG. 4 illustrates the effect of the implementation of the invention—more particularly as regards a marking density and distinctness—by illustrating the visual aspect of the cards obtained observed with binoculars:

By a laser marking method according to the state of the art on a PC card (FIG. 4a), By a laser marking method according to the state of the art, on a PET/PVC card (FIG. 4b), By a laser marking method according to the invention on three cards made out of PET/PVC (FIGS. 4c to 4e). In the case of these Figures, the observation was shown:

↪ "Prior to" (means after the laser etching but prior to the lamination—on the left part of the Figure), and ↪ "After" (after the lamination—it being understood that in this case the lamination was not performed at the same time as the laser etching—on the right part of the Figure).

FIG. 5 illustrates the effect of the implementation of the invention—more particularly as regards the deformation—by illustrating the visual aspect of the cards obtained observed with a microscope:

By a laser marking method according to the state of the art on the PC card (FIG. 5a). No deformation of the material can be observed in this case, By a laser marking method according to the state of the art on a PET/PVC card (FIG. 5b). A few denser points which reveal an alteration of the material can be observed, By means of a laser marking method according to the invention, on three cards made of PET/PVC (FIGS. 5c to 5e). In the case of these Figures the observation was shown:

↪ After a lamination step (the left part of the Figure), and

↪ Without a lamination step (i.e. by implementing a method according to the state of the art—the right part of the Figure). Such Figures show defects in the case of the method of the state of the art, and these defects are variable depending on the precise type of the PET/PVC used for the card body.

FIG. 6 illustrates quantitatively the deformation of the surface of a support resulting from a laser customization performed according to the state of the art.

In the higher section of this Figure, the left part illustrates the region of a card which is characterized by a laser profile measuring device (profile meter). The right part shows the deformation which is translated into ordinates, in microns.

FIG. 6a illustrates the deformation observed after laser marking according to the state of the art in the case of a PC card. No deformation which can be measured with respect to the reference profile (which is illustrated on the curve of this Figure) can be observed.

FIG. 6b illustrates the deformation observed after the laser marking according to the state of the art on a PET/PVC card. A significant deformation of the order of 3 μm which can exceed several dozens of μm can be observed (FIG. 6e).

FIGS. 6c to 6th illustrate the deformations obtained on three PET/PVC cards. In the case of these Figures, the measurements made are shown:

➥ Without lamination step (i.e. by implementing a method according to the state of the art—on the left part of the Figure). Such figures show substantial deformations in the case of the method of the state of the art, and ➥ After a lamination step (right part of the Figure).

As a matter of fact, the advantages illustrated hereabove and obtained on supports such as PET/PVC cards are also interesting for all types of supports.

It is also possible to implement the invention on PC plastic cards, which will also make it possible to increase the quality of the marking (marking density and distinctness still increased).

The support of the invention may include a body made of another material than plastic more particularly natural or synthetic paper, wood, etc, as well as at least a transparent cover sheet.

The invention also makes it possible to obtain plasticized documents such as ID cards, driving licenses, badges, passport etc.

As mentioned hereabove, the invention is particularly interesting from an economic point of view for the marking of support the material of body and/or the cover sheet of which has a softening temperature which is much lower than that of PC (for example lower by approximately 20° C.).

The invention claimed is:

1. A method for a laser marking of a support comprising a body and a cover sheet, said method comprising the steps of a customization marking by etching the body of the support with a laser beam through the thickness of the cover sheet, and lamination of the support during or after the laser marking in order to reduce or prevent deformations of the cover sheet resulting from said etching, said lamination comprising applying a pressure on the support with the addition of a thermal energy at the level of the marking area and is performed only on the regions of the support including a laser marking.

2. A method according to claim 1, wherein said support is a plastic support.

3. A method according to claim 1, wherein said lamination is a hot lamination.

4. A method according to claim 1, wherein said lamination is performed at a temperature higher than a softening temperature of at least one of the materials which is in contact with the laser marking.

5. The method according to claim 1, wherein the cover sheet is made of a material having a softening temperature which is lower than that of PC polycarbonate.

6. A method according to claim 1, wherein said lamination is performed by dynamic lamination means making it possible to laminate the support white said support advances with respect to said lamination means.

7. A method according to claim 6, wherein said lamination is performed by pressing the support between two rollers, with the support advancing between said two rollers.

8. A method according to claim 1, wherein said lamination is performed using static lamination means.

9. A method according to claim 8, wherein said lamination is performed at the same time as said laser etching, with the laser beam going through said lamination means.

10. A method according to claim 8, wherein said lamination is performed by the static pressing of the support between lamination plates.

11. The method according to claim 1, wherein the body is made of a material having a softening temperature which is lower than that of PC polycarbonate.

12. The method according to claim 11, wherein the material of the body has a softening temperature lower than 140° C.

13. The method according to claim 12, wherein said material of the body is one of PET or PVC.

* * * * *